(No Model.)
E. H. PECK.
DRAWER PULL.
No. 398,183. Patented Feb. 19, 1889.
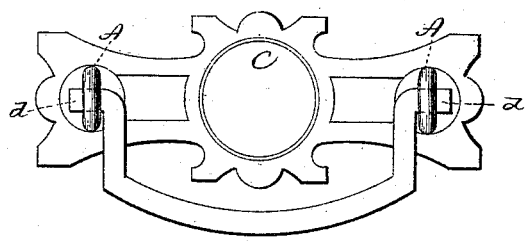
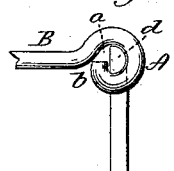
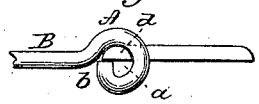
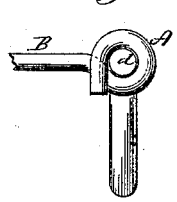
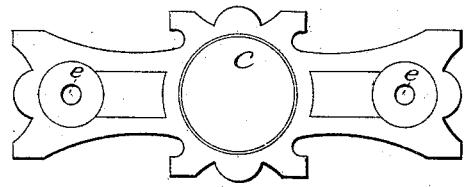
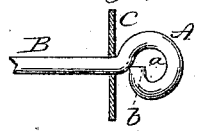
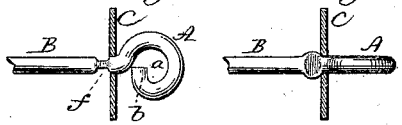
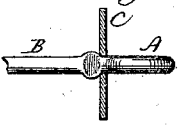
Witnesses,
J. N. Shumway.
Fred C. Earle.
Eugene H. Peck,
Inventor
By atty.

UNITED STATES PATENT OFFICE.

EUGENE H. PECK, OF MERIDEN, CONNECTICUT, ASSIGNOR TO THE MERIDEN BRONZE COMPANY, OF SAME PLACE.

DRAWER-PULL.

SPECIFICATION forming part of Letters Patent No. 398,183, dated February 19, 1889.

Application filed December 24, 1883. Serial No. 294,528. (No model.)

*To all whom it may concern:*

Be it known that I, EUGENE H. PECK, of Meriden, in the county of New Haven and State of Connecticut, have invented a new Improvement in Drawer-Pulls; and I do hereby declare the following, when taken in connection with accompanying drawings and the letters of reference marked thereon, to be a full, clear, and exact description of the same, and which said drawings constitute part of this specification, and represent, in—

Figure 1, a front view of the pull complete; Fig. 2, a side view of the socket detached; Fig. 3, a front view of the handle detached; Fig. 4, a transverse section through one of the pivots; Fig. 5, a side view of the socket, showing the handle as hanging in the down position; Fig. 6, the same, showing the handle as in the up position; Fig. 7, a modification in the construction of the socket; Fig. 8, a face view of the base detached; Fig. 9, a vertical section showing the shank as set through one of the holes in the base; Figs. 10 and 11, sections illustrating the spreading of the shank to form projections against the inside of the base.

This invention relates to an improvement in that class of drawer-pulls in which the handle is in the form of a loop, having a pivot at each end, hinged to the front of the drawer by sockets prepared to receive the pivot ends of the handle.

The invention relates particularly to the construction of the socket, the object being to construct the socket from wire, and at the same time form a stop against which the handle may be brought to rest when raised to the proper position for a pull, or, when dropped, to prevent its contact with the drawer-front; also, to practically secure the said wire eyes or sockets to a plate or rose without the employment of solder; and the invention consists in the construction, as hereinafter described, and particularly recited in the claims.

A represents the socket. This is made from a piece of wire of a length sufficient to form the socket and the shank B. The wire is bent at its end to form an eye, $a$, the end $b$ turned into the eye so as to form a shoulder within the eye. This completes the socket.

The handle is constructed with pivots $d$, which are of semicircular or elliptical shape in transverse section, as seen in Fig. 4, and correspond substantially to the eye $a$ of the socket. One socket is provided for each pivot of the handle and the pivots are introduced into the socket, as seen in Fig. 5, and when hanging in the vertical position, as seen in Fig. 5, they rest against the inner surface of the ends $b$ of the wire, which prevent the handle from swinging against the drawer-front; but when the handle is turned up, as seen in Fig. 6, the flat side of the pivot comes to a bearing on the end $b$ of the wire in the eye as a stop to prevent the handle from rising beyond the proper position for the pull.

In some cases the stop against the rise of the pull is not required. In such case the end $b$ of the wire may be turned to one side of the body, as seen in Fig. 7, and form a stop against which the handle will bear when it drops to its vertical position, so as to prevent contact with the drawer-front. I however prefer to construct the socket so as to form a stop to limit the movement of the handle in both the up and down directions.

In the modification shown in Fig. 7 the pivot may be cylindrical, as represented in that figure, $d$ representing the pivot. These sockets are usually connected by a plate, as C, this plate being made of sheet metal of an ornamental character, to lie against the front of the drawer and form a base for the sockets. This base C is cut from sheet metal, as seen in Fig. 8, and pierced for the shanks of the sockets, as at $e$ $e$, Fig. 8, the holes corresponding in diameter to the diameter of the shank of the socket.

The shanks are introduced through the sockets, leaving the eye upon the outside, as seen in Fig. 9. Then the shank is struck upon the inside of the base C and close up to the base, as seen at $f$, Fig. 10, which contracts the diameter of the shank in one direction, but correspondingly enlarges it in the opposite direction by throwing the metal out at each side and against the base C, as seen in Fig. 11. This projection of the shank upon the inside of the base clamps the base between these projections on the inside and the eye upon the outside, so as to make a firm connection between the base and the eye, and without solder.

The shank is screw-threaded and extends through the drawer-front, so that a nut may be applied upon the shanks on the inside, as in the usual construction; or, in case the plate is not employed, the screw-threaded shank may be driven directly into the drawer-front.

I claim—

1. The herein-described improvement in drawer-pulls, consisting of a socket made from wire bent to form an eye at the outer end to receive the pivot, the end of that portion of the wire which forms the eye serving as a stop against which the handle may rest, substantially as described.

2. A socket for drawer-pulls, made from wire, its end bent to form an eye to receive the pivot of the handle, the end of the wire turned into the eye and so as to form a shoulder within the eye, the pivot of the handle being non-cylindrical in transverse section, substantially as described, and whereby the said end of the wire within the eye forms a stop both for the up and down swing of the handle.

3. A drawer-pull consisting of the ornamental base, constructed with holes through which the shank of the sockets may be introduced, combined with sockets made from wire, the outer end of the wire bent to form eyes, the shank of the sockets inserted through the holes in the base and so as to bring the eye against the front of the base, and the shank spread inside and close up to the base, forming projections on the shank on the inside of the base and whereby the base is clamped between the said projections on the inside and the eye upon the outside, substantially as specified.

EUGENE H. PECK.

Witnesses:
 FRED C. EARLE,
 J. H. SHUMWAY.